March 17, 1953     J. E. HOOPES     2,631,759
SLIDE VALVE FOR CONTROLLING THE FLOW OF SUSPENDED SOLIDS
Filed Nov. 8, 1947
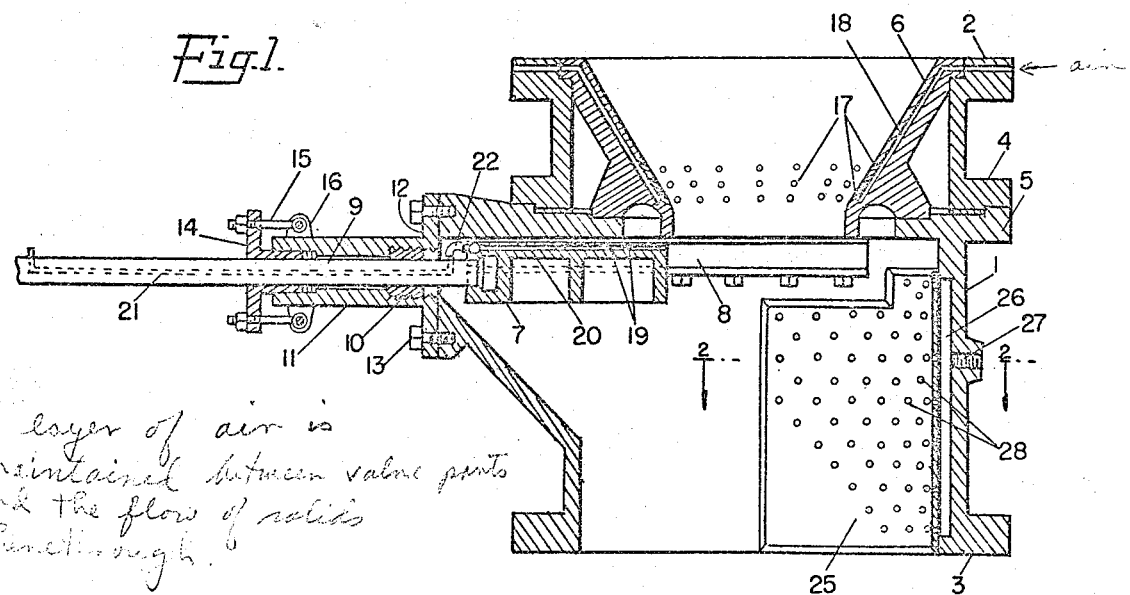
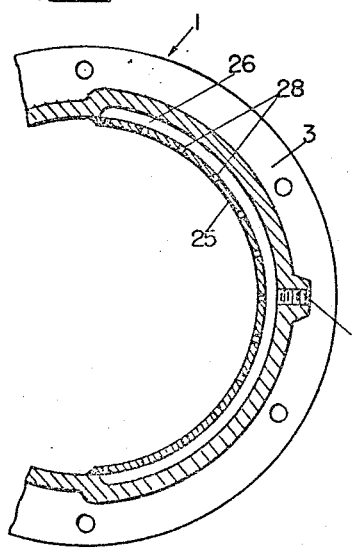
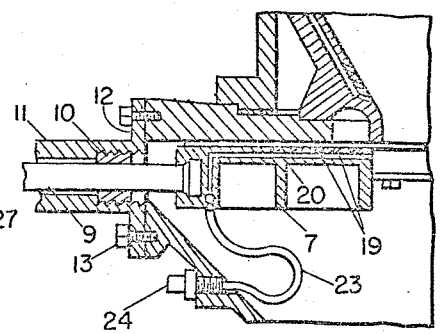
INVENTOR
JOHN E. HOOPES
BY
Pennie, Edmonds, Morton & Barrows
ATTORNEYS Patented Mar. 17, 1953

2,631,759

UNITED STATES PATENT OFFICE 2,631,759

SLIDE VALVE FOR CONTROLLING THE FLOW OF SUSPENDED SOLIDS

John E. Hoopes, Chester, Pa., assignor to Sinclair Refining Company, New York, N. Y., a corporation of Maine Application November 8, 1947, Serial No. 784,857

3 Claims. (Cl. 222—193)

This invention relates to the construction and operation of valves and provides improvements of particular advantage in valves to be used to control the flow of suspended solids.

The invention is especially useful as applied to slide valves of the general type, commonly used to control the flow of such suspensions and provides means for materially reducing erosion of the valve parts by the suspended solids.

In the so-called fluid catalyst process, for instance, extensively used in the pyrolytic conversion of hydrocarbons, and in which finely divided catalysts in suspension is circulated through the system, serious flow-control-valve erosion is experienced. In fluid catalyst operation, the erosion of the slide valves commonly used has been so severe as to necessitate the use of two such slide valves in series, one of which is kept in the open position for use in an emergency, while the other is being used to control the flow of the catalyst stream. Even so, it has been necessary frequently to replace the valves, or valve parts, in spite of the use of erosion resistant linings.

In accordance with my present invention, I materially reduce erosion of the valve parts by maintaining a blanket, or cushion, of air or other gas between the inner surface of the valve parts subject to wear and the stream of suspended solids. This is accomplished by providing a plurality of perforations leading outwardly through the surface subject to erosion from a duct or ducts within, or to the rear, of the metal part. Means are provided for passing air, or other gas, under pressure to the ducts and inwardly through the perforations. The particular cushioning gas to be used will depend somewhat upon the process and the particular stage of the process in which the valve is employed. Air is conveniently used where permissible, but other gases may be used, for instance, one which is inert with respect to the suspension or which is desirable or at least is not objectionable in the conduit, or subsequent zones of the apparatus.

The spacing and size of the perforations and the rate at which the cushioning gas is passed therethrough are subject to considerable variation and will depend upon the intended rate of flow of the suspension through the valve, the nature and density of the suspension, and the design of the particular valve or valve part to be blanketed. The flow of the cushioning gas and the spacing in cross-sectional area of the perforations should be such as to maintain a cushion or blanket of the gas over the inner surface adjacent the flowing stream of suspension.

Under more severe conditions, some wear is inevitable in spite of my gas blanket and under such conditions, the valve or portions thereof more susceptible to wear or erosion may, with advantage, be lined with wear plates, or else, the valve may be provided with replaceable parts, the inner surface being perforated and the valve parts so constructed and arranged as to provide means for passing cushioning air inwardly through the perforations, as previously described.

My invention will be further described and illustrated by reference to the accompanying drawings which represent a particularly advantageous embodiment thereof in a slide valve and of which—

Figure 1 is a vertical section,

Figure 2 is a fragmentary, horizontal section along lines 2—2 of Figure 1, and

Figure 3 is a fragmentary, vertical section of an alternate arrangement for feeding the cushioning gas to the sliding member of Figure 1.

The valve housing 1 is generally cylindrical and is provided with a suitable flange 2 for connecting the inlet port of the housing with a flange on the inlet line, not shown, and is provided with a flange 3 for connecting the housing with the outlet line. Also, flanges 4 and 5 are provided for assembling the upper and lower members of the housing so as to provide ready access to the interior of the valve. The respective flanges are provided in the customary manner with suitable holes or other fastening means.

The inlet end of the valve is equipped with a removable inlet port liner 6 which tapers toward its lower end to form the valve seat adapted to be closed by the sliding member 7 which moves along and is vertically supported by the guides 8.

The sliding member 7 is connected to and is adapted to move back and forth over the valve seat by shaft 9 which is supported by bearing 10. The bearing is, in turn, supported by bracket 11, which is connected with the main valve housing by flange 12 and machine screws 13.

The shaft 9 extends beyond the bracket to a convenient source of power, not shown, for opening and closing the valve by moving the slide back and forth over the valve seat, the shaft being sealed at the outer end of the bracket by packing gland 14, the position of which is adjustable by means of the threaded members 15 which are connected to lugs 16 of the bracket.

The inlet port liner 6 is fabricated of metal, advantageously an erosion resistant metal, carbon steel, for instance, and is provided with a plurality of ducts such as indicated at 18, extending through the body of the liner and connected with perforations 17 to supply cushioning gas thereto. The outer ends of the respective ducts 18 are so positioned as to register with a corresponding number of cushioning gas inlets extending through flange 2 of the valve housing. This port liner 6 is removably supported by the housing and is, with advantage, readily replaceable should occasion arise.

The slide member 7 is also provided at its upper surface with a plurality of perforations 19 connecting at their inner ends with ducts 20 which, in turn, are connected with duct 21 extending inwardly through the shaft 9. The duct 21 and ducts 20 may, with advantage, be connected through a flexible metallic duct 22. Alternatively, the ducts 20 may be connected through flexible metallic duct 23 to the cushioning gas inlet 24, as shown in Figure 3 of the drawings.

In the use of the slide valve of the general type described, excessive erosion frequently occurs, particularly when the valve is in the partly closed position, on the inner surface of the housing beneath the valve seat and especially beneath the valve opening. In order to minimize the erosion at this point, I provide the valve with a semicircular wear plate 25, such as shown in greater detail in Figure 2 of the drawings. This wear plate 25 is likewise perforated over a part at least of its surface, the inner ends of the perforation being connected with ducts 26 along the inner surface of the housing 1 just back of the wear plate and to which cushioning air is supplied through connections 27. The wear plate is, with advantage, welded or otherwise securely fastened in the bracket so that air supplied to the duct 26 is caused to flow outwardly through the perforations 28.

While I have shown the wear plate in the lower portion of the valve extending over only half of the circumference of the valve, it will be understood that where erosion conditions warrant the entire lower surface of the valve chamber may be so constructed and arranged as to be protected by a blanket of cushioning gas, as herein described.

Though it is frequently desirable to protect the valve by wear plates, or other movable parts, it will be understood that the invention is not so restricted, but also contemplates the protection of permanent parts of the valve by means of perforations extending through the valve part surface and connected with ducts adapted to deliver a gas under pressure to the perforations so as to maintain a cushioning blanket of gas on the inner surfaces.

It is usually particularly desirable that the perforations extending through the surfaces to be protected be set at such an angle to the surface of egress that the issuing fluid will tend to flow inwardly in a somewhat downstream direction in the inlet port liner and generally upwardly and toward the far end of the valve seat in the slide member.

It will be understood that reference herein and in the appended claims to the use of air or other gas as the cushioning medium is intended to include gaseous media generally, vapors for instance. Further, though the use of such gaseous cushioning medium is generally more advantageous, in some instances, it may be desirable to use a liquid for this purpose and such use is contemplated by my invention in its broader aspect.

I claim:

1. In a valve adapted to control the flow of finely divided solids in fluid suspension comprising a housing having an inlet port, an outlet port, a passageway connecting the two ports, and a valve seat surrounding said passageway having a seating face disposed downstream; a slide member having a seating surface on the flat upstream surface thereof; means for mounting said slide member in said housing downstream of said valve seat with said seating surface in contact with said seating face; means for sliding said slide member across said passageway to predetermined throttling positions; said slide member having a delivery duct positioned beneath its upstream surface and extending from its rearward edge to its leading edge, said slide member having a plurality of ducts in fluid communication with said delivery duct and extending through the upstream surface of the slide member over an area extending from its leading edge rearwardly to about the middle portion of the upstream surface, means for supplying a fluid medium under pressure to said delivery duct, the fluid ducts positioned at about the middle portion of the upstream surface and the remaining ducts positioned near the leading edge being angularly disposed toward the leading edge of the slide member to establish and maintain respectively a buffer blanket of fluid medium substantially free from suspended solid particles between the slide member and the flowing suspension.

2. A valve adapted to control the flow of finely divided solids in fluid suspension comprising a housing having an inlet port, an outlet port, and a passageway connecting the two ports; a tapered removable inlet port liner mounted in said housing having a valve seating face disposed downstream at its lower end, the surface of said liner having a plurality of perforations directed substantially downstream; means for supplying a fluid medium under pressure to said perforations to form a buffer blanket of fluid medium over said inlet port liner; a slide member having a seating surface on the flat upstream surface thereof; means for mounting said slide member in said housing downstream of said port liner with said seating surface in contact with said seating face; means for sliding said slide member across said passageway to predetermined throttling positions; said slide member having a delivery duct positioned beneath its upstream surface and extending from its rearward edge to its leading edge, said slide member having a plurality of ducts in fluid communication with said delivery duct and extending through the upstream surface of the slide member over an area extending from its leading edge rearwardly to about the middle portion of the upstream surface, and means for supplying a fluid medium under pressure to said delivery duct, the fluid ducts positioned at about the middle portion of the upstream surface and the remaining ducts positioned near the leading edge being angularly disposed toward the leading edge of the slide member to establish and maintain respectively a buffer blanket of fluid medium substantially free from suspended solid particles between the slide member and the flowing suspension.

3. A valve adapted to control the flow of finely divided solids in fluid suspension comprising a housing having an inlet port, an outlet port, and a passageway connecting the two ports; a tapered removable inlet port liner mounted in said housing having a valve seating face disposed downstream at its lower end, the surfaces of said liner having a plurality of perforations directed substantially downstream; means for supplying a fluid medium under pressure to said perforations to form a buffer blanket of fluid medium over said inlet port liner; a slide member having a seating surface on the flat upstream surface thereof; means for mounting said slide member in said housing downstream of said port liner with said seating surface in contact with said seating face; means for sliding said slide member across said passageway to predetermined throttling positions; said slide member having a delivery duct positioned beneath its upstream surface and extending from its rearward edge to its leading edge, said slide member having a plurality of ducts in fluid communication with said delivery duct and extending through the upstream surface of the slide member over an area extending from its leading edge rearwardly to about the middle portion of the upstream surface; means for supplying a fluid medium under pressure to said delivery duct, the fluid ducts positioned at about the middle portion of the upstream surface and the remaining ducts positioned near the leading edge being angularly disposed toward the leading edge of the slide member to establish and maintain respectively a buffer blanket of fluid medium substantially free from suspended solid particles between the slide member and the flowing suspension; a removable wear plate mounted on the housing in the passageway downstream of the slide member, said wear plate having a plurality of perforations; and means for supplying a fluid medium under pressure to said perforations to form a buffer blanket of fluid medium over said wear plate.

JOHN E. HOOPES.

REFERENCES CITED

The following references are of record in the file of this patent:

UNITED STATES PATENTS

| Number | Name | Date |
|---|---|---|
| 703,583 | Hirt | July 1, 1902 |
| 1,778,429 | Morrow | Oct. 14, 1930 |
| 1,873,119 | Griswold | Aug. 23, 1932 |
| 2,305,724 | Luetzelschwab | Dec. 22, 1942 |
| 2,315,053 | Holt | Mar. 30, 1943 |
| 2,378,607 | Watts | June 19, 1945 |